United States Patent
Kulkarni et al.

(10) Patent No.: US 11,630,661 B2
(45) Date of Patent: Apr. 18, 2023

(54) INTELLIGENT LOGGING AND AUTOMATED CODE DOCUMENTATION

(71) Applicant: Kyndryl, Inc., New York, NY (US)

(72) Inventors: Sudhanva Kulkarni, Bangalore (IN); Nalini M, Chennai (IN); Gautam K. Bhat, Kadri (IN); Muniyandi Perumal Thevar, Madurai (IN)

(73) Assignee: Kyndryl, Inc., New York, NY (US)

(*) Notice: Subject to any disclaimer, the term of this patent is extended or adjusted under 35 U.S.C. 154(b) by 0 days.

(21) Appl. No.: 17/388,069

(22) Filed: Jul. 29, 2021

(65) Prior Publication Data
US 2023/0031997 A1 Feb. 2, 2023

(51) Int. Cl.
G06F 8/73 (2018.01)
G06N 5/04 (2023.01)

(52) U.S. Cl.
CPC ........ *G06F 8/73* (2013.01); *G06N 5/04* (2013.01)

(58) Field of Classification Search
CPC .................................... G06F 8/73; G06N 5/04
See application file for complete search history.

(56) References Cited

U.S. PATENT DOCUMENTS

| | | | |
|---|---|---|---|
| 6,654,953 B1 | 11/2003 | Beaumont | |
| 7,484,205 B2* | 1/2009 | Venkatapathy | G06F 11/3624 717/158 |
| 8,108,689 B2 | 1/2012 | Nicolson | |
| 8,156,053 B2 | 4/2012 | Mika | |
| 8,966,362 B2 | 2/2015 | Smetters | |
| 9,384,112 B2 | 7/2016 | Petersen | |
| 9,418,150 B2 | 8/2016 | Charlot | |
| 9,747,082 B2 | 8/2017 | Bates | |
| 10,474,476 B1* | 11/2019 | Zhang | G06F 8/48 |
| 10,809,985 B2* | 10/2020 | Hamby | G06F 8/436 |
| 11,089,000 B1* | 8/2021 | Muthusamy | G06F 21/6245 |
| 2009/0007065 A1* | 1/2009 | Becker | G06F 8/443 707/999.102 |
| 2009/0254540 A1 | 10/2009 | Musgrove | |
| 2014/0310679 A1 | 10/2014 | Bhattacharya | |

(Continued)

OTHER PUBLICATIONS

"Apache Log4j 2", Logging Services, Last Published: Mar. 6, 2021, Version: 2.14.1, 3 pages, downloaded from the Internet on May 12, 2021, 3 pages, <https://logging.apache.org/log4j/2.x/>.

(Continued)

*Primary Examiner* — Thuy Dao
*Assistant Examiner* — Stephen D Berman
(74) *Attorney, Agent, or Firm* — Dan Housley, Esq.; Kevin P. Radigan, Esq.; Heslin Rothenberg Farley & Mesiti P.C.

(57) ABSTRACT

Methods, computer program products, and/or systems are provided that perform the following operations: reading lines of code included in a collection of source code; identifying an assigned tag in the collection of source code; identifying a start tag location and an end tag location associated with the assigned tag, wherein the lines of code included between the start tag location and the end tag location identify a code block; processing the code block to generate logging data for the code block based, at least in part, on the assigned tag; and providing the logging data for linking to executable byte code compiled from the collection of source code, wherein the logging data is used to log code data relating to the code block during execution of the executable byte code.

17 Claims, 13 Drawing Sheets

(56) References Cited

U.S. PATENT DOCUMENTS

| | | |
|---|---|---|
| 2015/0378724 A1 | 12/2015 | Balachandran |
| 2016/0011868 A1 | 1/2016 | Frenkiel |
| 2016/0062876 A1* | 3/2016 | Narayanan ............. G06N 5/022 |
| | | 717/124 |
| 2017/0017789 A1* | 1/2017 | Daymont .............. G06F 21/566 |
| 2017/0286262 A1* | 10/2017 | Hejlsberg .................. G06F 8/51 |
| 2020/0110654 A1* | 4/2020 | Oleszkiewicz ..... G06F 11/0781 |
| 2020/0142380 A1 | 5/2020 | Karlsson |
| 2020/0183681 A1 | 6/2020 | Ramsl |

OTHER PUBLICATIONS

"Implementing a Custom Spring AOP Annotation", Baeldung, Last modified: May 6, 2021, 10 pages, <https://www.baeldung.com/spring-aop-annotation>.

"Lesson: Annotations", Oracle, The Java™ Tutorials, downloaded from the Internet on May 12, 2021, 1 page, <https://docs.oracle.com/javase/tutorial/java/annotations/>.

"Write and View Logs with Logcat", Developers, Android Studio, downloaded from the Internet on May 12, 2021, 2 pages, <https://developer.android.com/studio/debug/am-logcat>.

Bugayenko, Yegor, "Java Method Logging with AOP and Annotations", Java Code Geeks, Sep. 11, 2014, 10 pages, <https://www.javacodegeeks.com/2014/09/java-method-logging-with-aop-and-annotations.html>.

\* cited by examiner

454

```
#performanceS
x = 10000 print ("System configurations before starting the process")
print (memory)
print (cpu)
print (ram)
print (datetime)
while i < x
    #get the data from DB print ("System configurations during the process")
    print (memory)
    print (cpu)
    print (ram)
    print (data)
    #Do some processing print ("System configurations after process data")
    print (memory)
    print (cpu)
    print (ram)
    print (data)

#send record into third party by calling external API
    print (connectionstatus)
    print ("System configurations after send the data to API the process")
    print (memory)
    print (cpu)
    print (ram)

print ("System configurations after the process")
    print (memory)
    print (cpu)
    print (ram)
    print (totaltime)
#performanceE
```

FIG. 4G (F)

INTELLIGENT LOGGING AND AUTOMATED CODE DOCUMENTATION

BACKGROUND

The present invention relates generally to the field of software programming, and more particularly to providing for intelligent content-based logging and/or documentation for program code.

SUMMARY

According to an aspect of the present invention, there is a method, computer program product and/or system that performs the following operations (not necessarily in the following order): reading lines of code included in a collection of source code; identifying an assigned tag in the collection of source code; identifying a start tag location and an end tag location associated with the assigned tag, where the lines of code included between the start tag location and the end tag location identify a code block; processing the code block to generate logging data for the code block based, at least in part, on the assigned tag; and providing the logging data for linking to executable byte code compiled from the collection of source code, where the logging data is used to log code data relating to the code block during execution of the executable byte code.

BRIEF DESCRIPTION OF THE DRAWINGS

FIGS. 4A through 4G depict a block diagram of an example system architecture for intelligent code logging and documentation, according to embodiments of the present invention;

DETAILED DESCRIPTION

Figure 1:
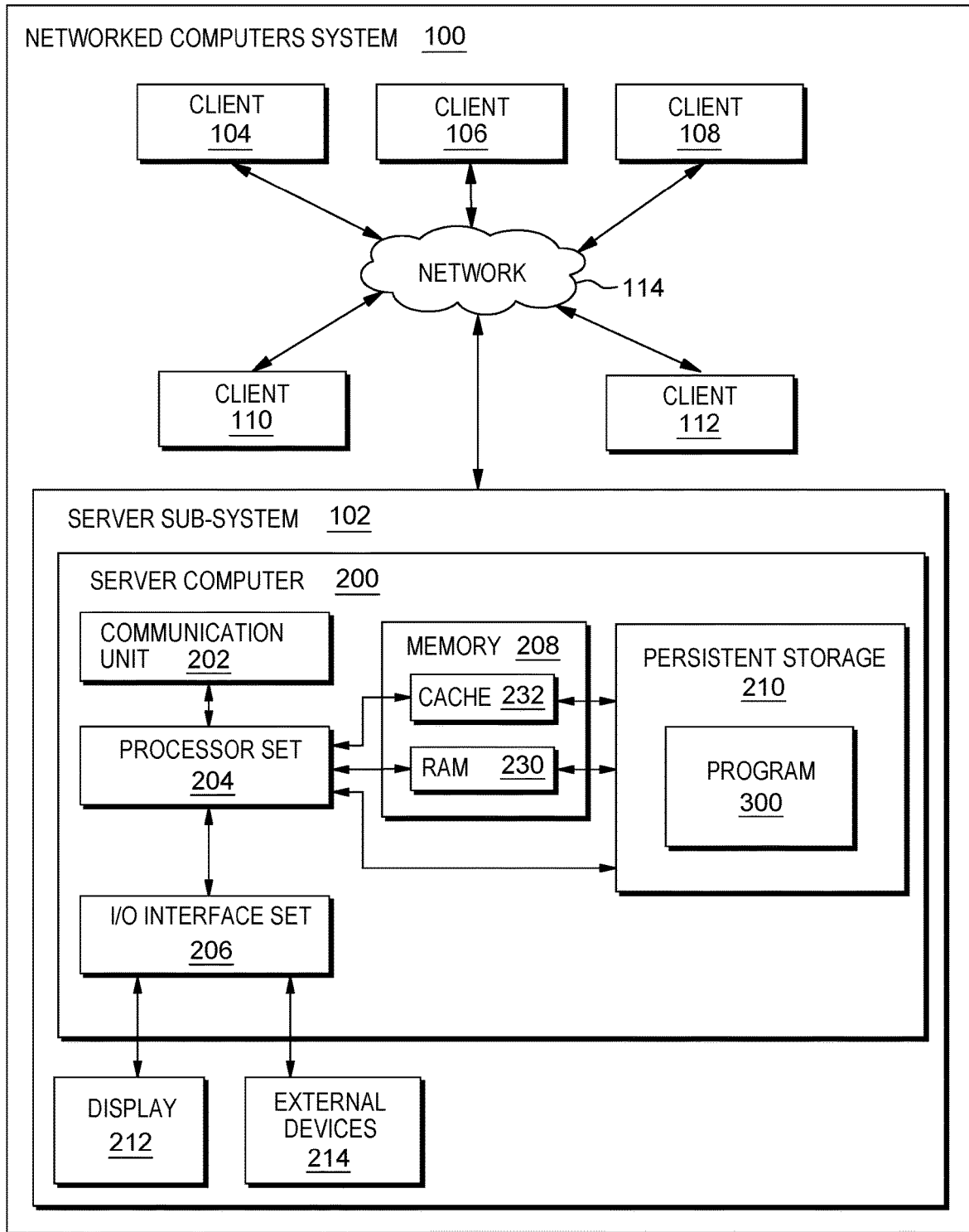
FIG. 1 depicts a block diagram view of a first embodiment of a system, according to the present invention.

According to aspects of the present disclosure, systems and methods can be provided to enable intelligent logging and automated code documentation. In particular, systems and methods of the present disclosure can provide for using tags assigned to source code to automatically generate log data and/or code documentation. The systems and methods of the present disclosure can provide for assigning tags to blocks of code during development of source code (e.g., when source code is being written, etc.). The systems and methods of the present disclosure can provide for generating tags data for the code that can be linked with the compiled executable code. The tags data can include tag configuration data and log file mapping data. The systems and methods of the present disclosure can provide for generating and storing log data based at least in part on the tags data linked with an application (e.g., executable code, etc.). In some embodiments, the systems and methods of the present disclosure can provide for retrieving log data based, at least in part, on the tag data linked to an application.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can create tags for application source code to provide automatic logging and/or documentation assign, generate tag configuration data and log file mapping data for compiled application byte code, create and/or update log files for an application based on tag data; retrieve log file data based on tag data; and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
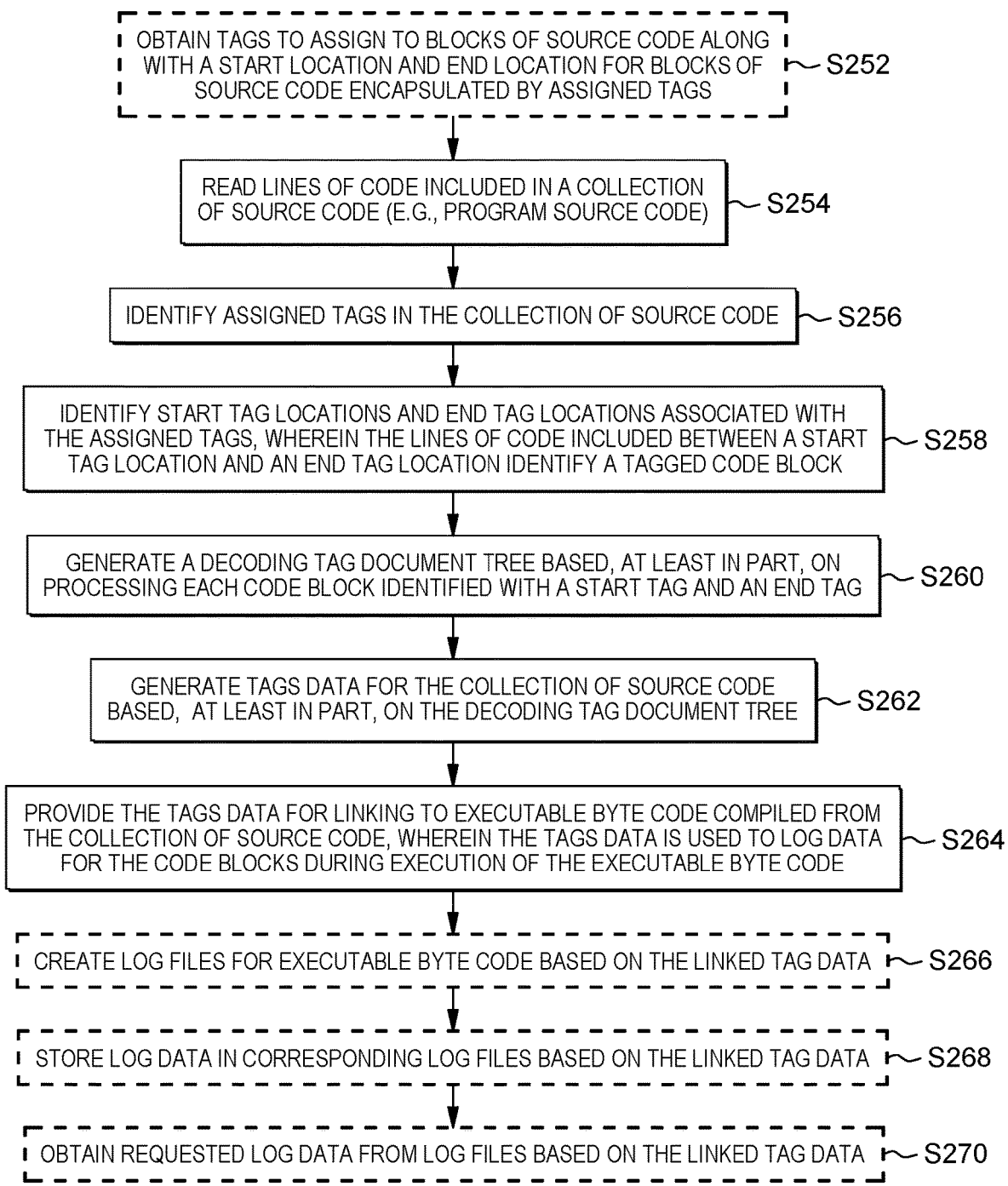
FIG. 2 depicts a flowchart showing a first embodiment method performed, at least in part, by the first embodiment system.
Figure 3:
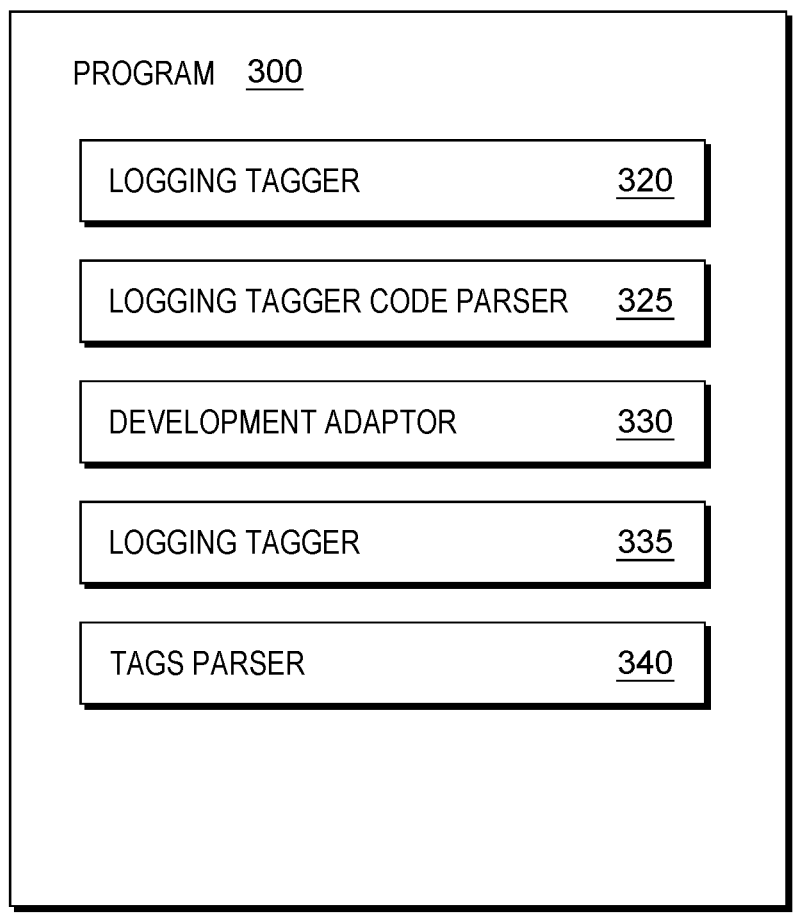
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for intelligent code logging and/or code documentation may optionally begin at operation S252, where a computing system (e.g., server computer 200 of FIG. 1 or the like) may obtain data associated with a plurality of tags that can be used for intelligent logging/documentation. In addition, in some embodiments, log file data (e.g., log file names, etc.) may be mapped to the plurality of tags such that content (log data, etc.) associated with specific tags may be stored to a designated log file. In some embodiments, the plurality of tags may include one or more standard tags and/or one or more customized tags. As an example, standard tags may include requests, events, responses, risks, dataflow, security, availability, audit, performance, and/or the like. In some embodiments, customized tags may include one or more tags that have been modified (e.g., changed tag name, etc.), one or more new added tags, and/or the like. In some embodiments, new tags may be mapped to existing tags to align with a specified purpose of the existing tags.

In some embodiments, one or more of the plurality of tags may be presented for selection (e.g., as a list of tags, etc.) during code development (e.g., writing source code, etc.) to be assigned to specific blocks of source code. For example, in some embodiments, a user (e.g., developer, etc.) can select a control key, shortcut key, and/or the like to display a list of available configured tags that may be selected to assign to a block of the code. In some embodiments, the assigned tags can provide for automating the logging and/or documentation for the blocks of source code. Additionally, in response to the selection of tags for a block of source code, a start location (e.g., line number of start tag, etc.) and an end location (e.g., line number of end tag, etc.) can be obtained for the particular block of source code encapsulated by a set of tags (e.g., start tag, end tag).

As an example, in some embodiments, a logging tagger 320 of FIG. 3 and/or the like can provide for obtaining a plurality of tags, data associated with log files (e.g., log file name, etc.) to be used with the tags, and/or the like. The logging tagger 320 and/or the like can present a listing of one or more tags that may be assigned to blocks of source code during development (e.g., writing, etc.) of the source code. The logging tagger 320 and/or the like can obtain a selection of a particular tag to be assigned to a block of source code along with an indication of the start location and the end location of the block of source code to which the particular tag is to be assigned. In some embodiments, the logging tagger 320 may provide a listing of one or more log files that can be selected as the specific log file where data associated with a block of source code should be stored. The logging tagger 320 may obtain a selection of the log file to be used and associate it with the assigned tags for the block of source code.

Processing proceeds to operation S254, where the computing system (e.g., server computer 200 of FIG. 1 or the like) reads the lines of code included in a collection of source code (e.g., current program source code being developed, etc.). As an example, a logging tagger code parser 325 and/or the like can provide for reading the lines of code in the current source code. For example, in some embodiments, the logging tagger code parser 325 and/or the like can provide for parsing the current source code line by line.

Processing proceeds to operation S256, where the computing system (e.g., server computer 200 of FIG. 1 or the like) can identify the assigned tags that are included in the collection of source code. For example, the computing system (e.g., server computer 200 of FIG. 1 or the like) can identify the assigned tags that indicate the start and end of each tagged block of source code. As an example, a logging tagger code parser 325 of FIG. 3 and/or the like can identify the assigned tags included in the source code.

Processing proceeds to operation S258, where the computing system (e.g., server computer 200 of FIG. 1 or the like) identifies start tag locations and end tag locations associated with the assigned tags, wherein the lines of code included between a start tag location and an end tag location identifies a code block. As an example, a logging tagger code parser 325 of FIG. 3 and/or the like can identify start tag locations and end tag locations associated with assigned tags (e.g., marked with a start tag and an end tag, etc.).

Processing proceeds to operation S260, where the computing system (e.g., server computer 200 of FIG. 1 or the like) generates a tree structure (e.g., a decoding tag document tree, etc.) based, at least in part, on processing each code block identified with a start tag and an end tag. In some embodiments, for example, a language-specific parser is used to process (e.g., parse) the blocks of code and generate a tree (e.g., a decoding tag document tree, etc.). For example, a language-specific parser can identify the grammar of the code language and parse the blocks of code. As an example, a logging tagger code parser 325 of FIG. 3 and/or the like can provide for parsing the blocks of code and generate a decoding tag document tree for the source code. In some embodiments, a decoding tag document tree can include details in the tree structure such as grammar of the line of code, assigned tags, start line number (e.g., start location), end line number (e.g., end location), mapping logfile configuration, any customized/specific content for tags to be logged, variables, assumed meta data of the variables (e.g., using variable name), and/or the like.

Processing proceeds to operation S262, where the computing system (e.g., server computer 200 of FIG. 1 or the like) generates tags data (e.g., tag configurations, log file mappings, etc.), also referred to as "logging data," for the collection of source code (e.g., current developer source code, etc.) based, at least in part, on the decoding tag document tree. As an example, a logging tagger code parser 325, development tagger adaptor 330, and/or the like can generate tags data for the collection of source code based, at least in part, on tracing each node of the tree (e.g., decoding tag document tree). For example, in some cases, logging tagger code parser 325, development tagger adapter 330, and/or the like can identify, in a node of the tree, specific content associated with an assigned tag, and can include the specific content in the tags data.

As an example, in some embodiments, the computing system (e.g., logging tagger code parser 325, etc.) can trace each node of a decoding tag document tree by looping through the decoding tag document tree. The computing system (e.g., logging tagger code parser 325, etc.) can generate language-specific print statements of each line of code within a specific block. In some embodiments, the computing system can provide for displaying the auto-generated print statements to allow for review and/or customizing of the auto-generated statements (e.g., by developer, etc.). In such embodiments, the computing system (e.g., logging tagger code parser 325, etc.) can obtain (e.g., from developer, etc.) updates for one or more print statements (e.g., log statements, etc.), for example, to include additional details. In some embodiments, the computing system (e.g., logging tagger code parser 325, etc.) can generate the print statements without providing for displaying and/or updating the print statements (e.g., during compilation of the code, etc.).

In some embodiments, the computing system (e.g., development tagger adaptor 330, development operations server, etc.) can provide for building the application code, for example, based in part on the tagger logs (e.g., from logging tagger code parser 325, etc.), the decoding tag document tree, and or the like. For example, in some embodiments, the computing system (e.g., development tagger adaptor 330, development operations server, etc.) can generate byte code as well as tags data based on the source code with assigned tags, the logs, the decoding tag document tree, and/or the like.

Processing proceeds to operation S264, where the computing system (e.g., server computer 200 of FIG. 1 or the like) can provide the tags data (also referred to as "tag data" and/or "logging data") for linking to executable byte code compiled from the collection of source code, wherein the tags data is used to log code data during execution of the executable byte code. As an example, a development tagger adaptor 330 and/or the like can provide for linking the tags data to the executables to provide for using the tags data in logging code data. For example, in some embodiments, the tags data includes tag configuration data, log file mapping data, and or the like. The tags data (e.g., tags configurations, log file mappings, etc.) can be attached (e.g., linked, etc.) to the executables (e.g., byte code, etc.) generated from the collection of source code to provide for logging application data after the executable code is deployed (e.g., during application execution, etc.).

In some embodiments, as an example, the tag configuration data included in the tags data linked to the executable code (e.g., application, byte code, etc.) can include date/time data, log file names for tags, indicators for start and end of logs, customized tags data including mapping to standard tags, and/or the like.

Optionally, in some embodiments, processing may proceed to operation S266, where the computing system (e.g., server computer 200 of FIG. 1 or the like) may create log files for executable byte code based, at least in part, on the linked tags data. As an example, a development tagger adaptor 330, a logging tagger 335, and/or the like may generate log files for an application based, at least in part, on the tags data linked to executable code (e.g., byte code, application, etc.).

Optionally, in some embodiments, processing may proceed to operation S268, where the computing system (e.g., server computer 200 of FIG. 1 or the like) may store log data in corresponding log files based, at least in part, on the linked tags data. As an example, a logging tagger 335, tags parser 340, and/or the like may generate log data and store the log data to corresponding log files based on the tags data linked to the application code. For example, the tags data may include tags configuration data and the tags specific to the linked application. The computing system (e.g., tags parser 340, etc.) may read the tags data and map the log file(s) to store log data. In some embodiments, log file mapping (e.g., included in tags data, etc.) may map to a common log file for storing log data. In Some embodiments, log file mapping may include mapping to individual log files based on tag and log file mapping configurations. In some embodiments, the logging tagger 335, tags parser 340, and/or the like may also update tags data linked to application code, for example, updating date/time data, log start/end indicators, and/or the like.

Optionally, in some embodiments, processing may proceed to operation S270, where the computing system (e.g., server computer 200 of FIG. 1 or the like) may obtain requested log data from log files based, at least in part, on the linked tags data. As an example, a tags parser 340 and/or the like may read the tags data associated with an application and obtain log data from a corresponding log file based on the tag configuration and/or log file mapping data associated with particular tag(s) associated with the application code. In an example, the computing system (e.g., tags parser 340, etc.) may obtain the mapping for a log file (e.g., common log file, individual log file based on tag, etc.) and obtain start and end indicators for the log data location to retrieve log data for an application. The computing system (e.g., tag parser 340, etc.) may provide a bloc of log data for viewing to an end user (e.g., developers, architects, testers, managers, etc.).

In some embodiments, a tag parser (e.g., tag parser 340, etc.) may be common to multiple applications (e.g., on an application server, etc.) and can provide for retrieving logs from the multiple applications based on the assigned tags associated with the application code. As an example, in some embodiments, a tag parser can provide for obtaining all the performance logs with a "#performance" tag for multiple applications running on an application server.

Further Comments and/or Embodiments

Figure 4A:
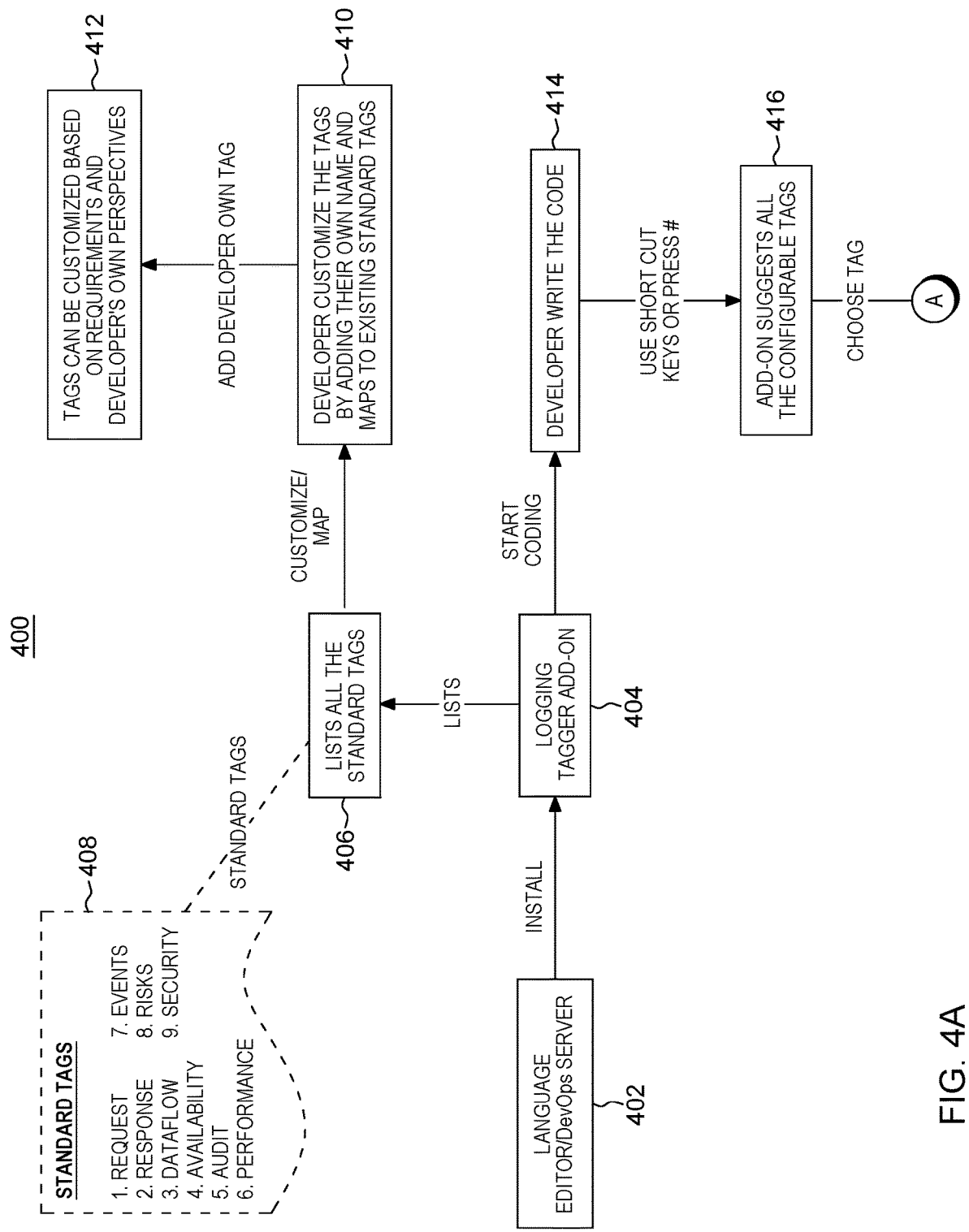

FIGS. 4A through 4G depict a block diagram of an example workflow architecture 400 for intelligent code logging and documentation according to embodiments of the present invention. As illustrated in FIG. 4A, in some embodiments, a logging tagger add-on 404 can be provided (e.g., associated with a code language editor/development ops server, etc.) to enable intelligent logging/documentation based on tags assigned to source code. In some embodiments, the logging tagger add-on 404 is installed by a language editor/DevOps server 402. In some embodiments, the logging tagger add-on 404 can provide a listing (406) of standard tags 408, for example, at start-up of the logging tagger. A user (e.g., developer, etc.) can customize tags (410), for example, by adding new tag names and mapping the new tag names to the existing standard tags 408, for example, to align with the purpose of the logging. A user (e.g., developer, etc.) can also create new tags (412), for example, based on requirements and/or the user's preferences.

While writing source code (414), a user (e.g., developer, etc.) can indicate that a tag should be added for a block of code (e.g., select control, shortcut key, etc.). The logging tagger add-on 404 can provide for displaying (416) suggested tags that can be assigned to the code.

Figure 4B:
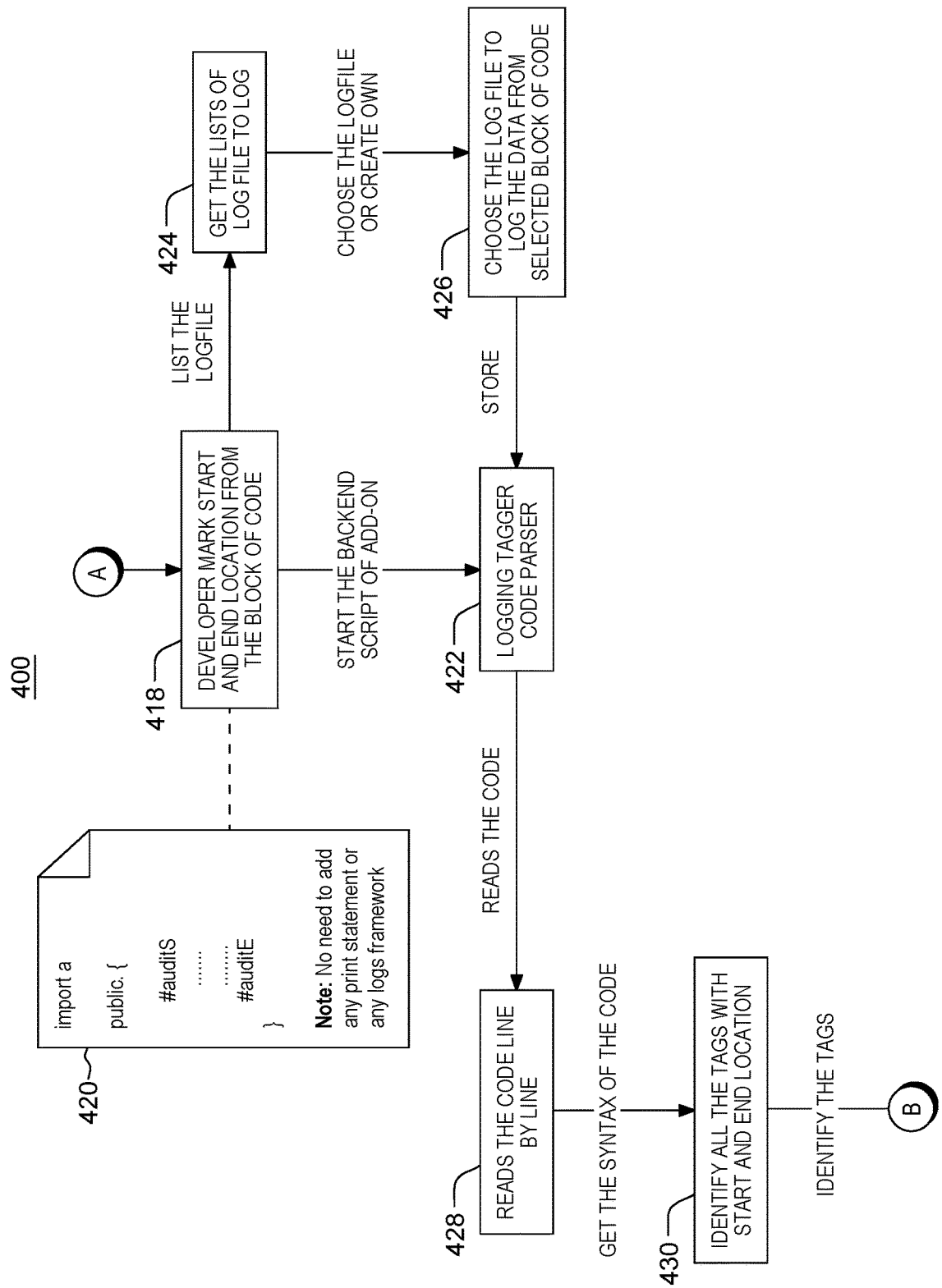

As illustrated in FIG. 4B, the user (e.g., developer, etc.) can select a tag to assign and indicate, or mark (418), the start and end of the block of code that is to be tagged (see marked block 420). In some embodiments, in response to a tag being selected, a list of log files that can be used to log data associated with the selected tag can be provided (424). The user (e.g., developer, etc.) can indicate, or choose (426), a log file that should be used to log data associated with the selected block of code. As an example, in some embodiments, tag types may include request, events, response, risks, dataflow, security, availability, audit, performance, and/or the like. In some embodiments, a logging tagger may provide requirement-based logging (e.g., debug, info, warning, error, etc.) such that the tagger may, for example, tag code functionality based on requirements and/or the like.

The source code with assigned tags can be provided to a logging tagger code parser 422. The logging tagger code parser 422 can read (428) the current code line by line and identify (430) all the assigned tags with a start location (e.g., start tag) and end location (e.g., end tag) of the tagged blocks of code.

Figure 4C:
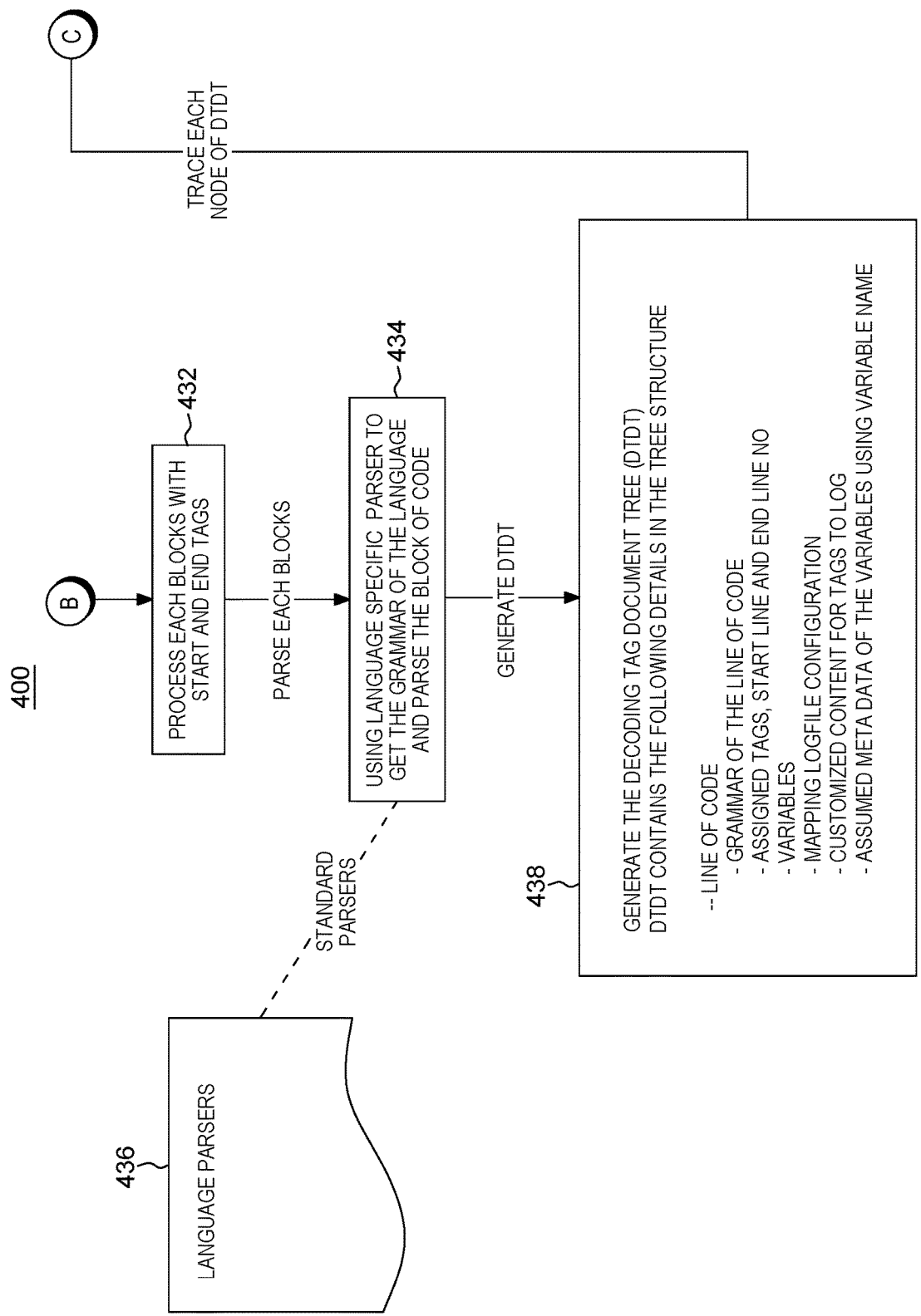

As illustrated in FIG. 4C, the logging tagger code parser 422 can process (432) (e.g., parse) each block of code using the start and end tags. The logging tagger code parser 422 can use (434) language-specific parsers 436 to obtain the grammar of the language and parse the block(s) of code. The logging tagger code parser 422 can generate (438) a decoding tag document tree (DTDT) based on the parsed blocks of code. The logging tagger code parser 422 can trace each node of the decoding tag document tree.

Figure 4D:
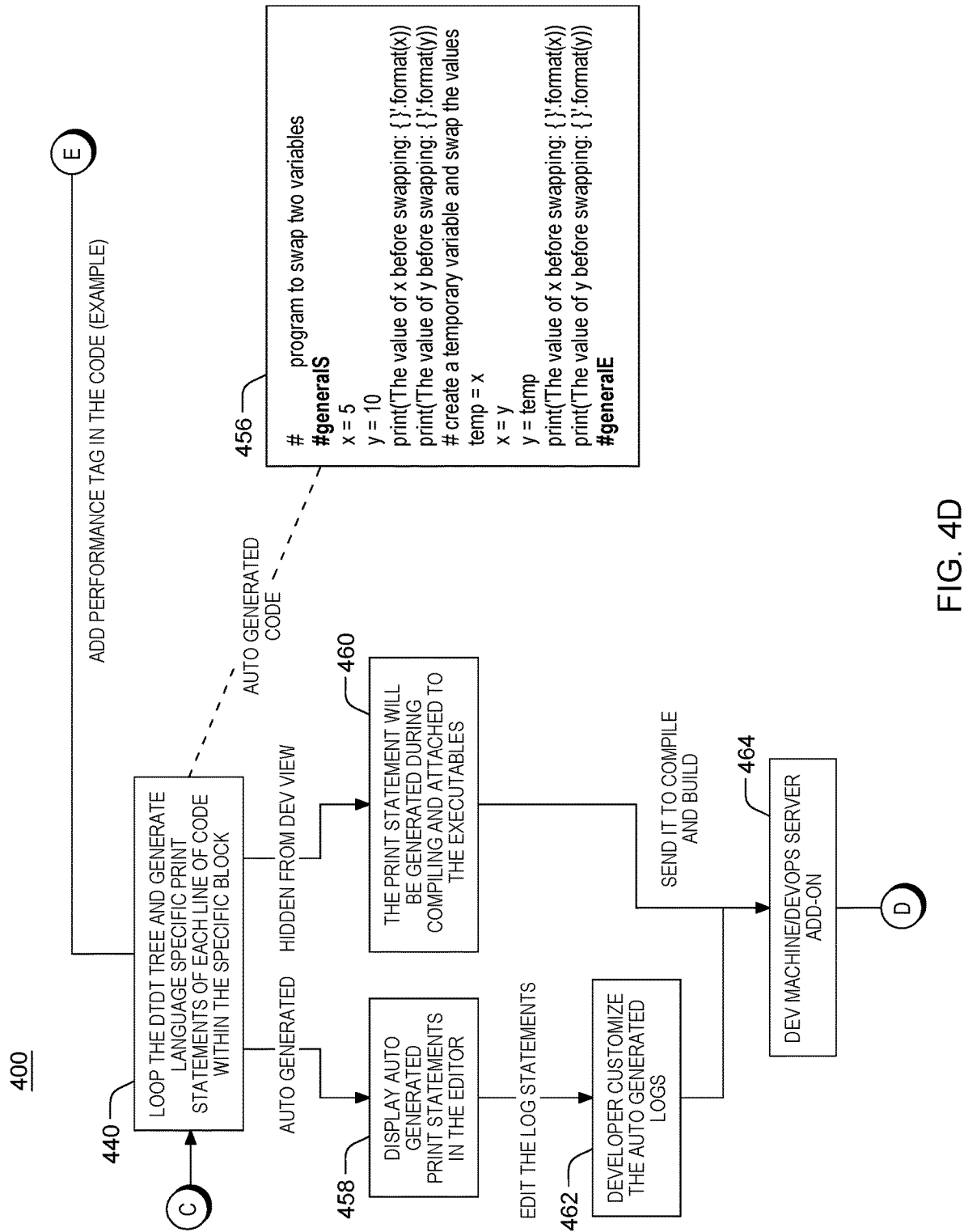

As illustrated in FIG. 4D, The logging tagger code parser 422 can loop (440) through the decoding tag document tree and generate language specific print statements (e.g., log statements, etc.) for each line of code within a specific block of code.

In some embodiments, the logging tagger code parser 422 can provide for displaying (458) automatically generated print statements (e.g., in auto-generated code 456) to the user (e.g., developer, etc.) and allow for editing the print statements, for example, to customize (462) generated logs (e.g., update the log print statements, add additional detail, etc.). In some embodiments, alternatively or additionally, the print statements may be generated (460) without providing for display, for example, during compiling.

The source code and tag information can be provided for compiling and building the executable byte code. For example, in some embodiments, the source code with assigned tags can be provided to a tagger adaptor (e.g., development machine/DevOps server add-on 464, etc.) for compiling and building the code.

Figure 4E:
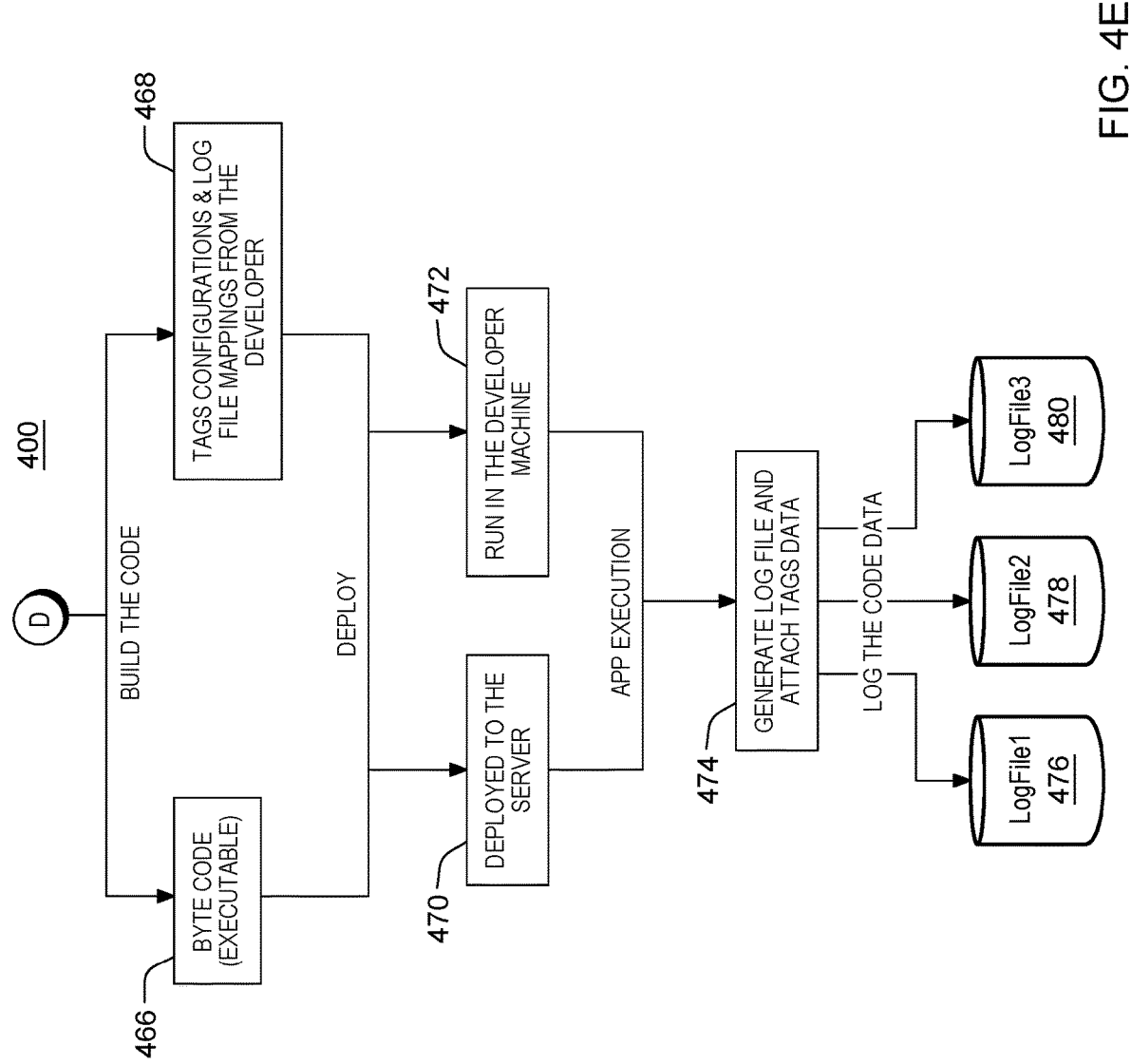

As illustrated in FIG. 4E, in some embodiments, the tagger adaptor 464 can assist in building the code using tagger logs. The executable byte code 466 can be generated from the source code along with tags configuration data and log file mapping data 468 (e.g., tags data). The tags configuration data and log file mapping data 468 can be attached (e.g. linked, etc.) to the executable code 466.

The application (e.g., executable byte code, etc.) can be provided for deployment and execution. For example, the application can be deployed (470) on a server and/or run (472) in a developer machine. During execution of the application, log data can be generated (474) (e.g., based on the tags data, etc.) and stored to log files (e.g., LogFile1 476, LogFile2 478, and LogFile3 480) based on log file mapping data included in the tags data for the application.

Figure 4F:
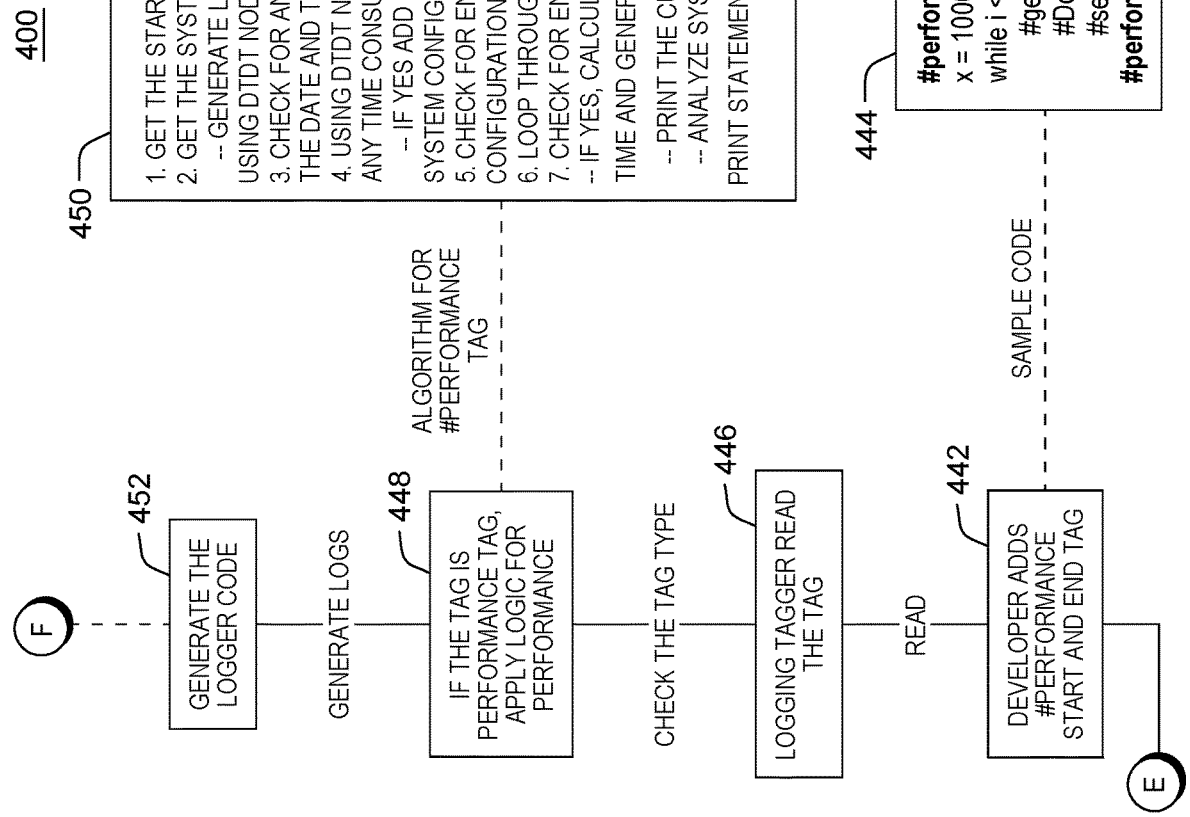

As illustrated in FIG. 4F, as an example, a performance tag can be added (442) to source code being developed. For example, a "#performance" tag can be selected to assign to a block of code 444 included in the source code. A "#performance" start tag can be added at the start of the block of code 444 and a "#performance" end tag can be added at the end of the block of code 444. A logging tagger can identify the tag when reading (446) the code and check the tag type. In response to the tag being identified as a particular type of tag (e.g., a performance tag), a logic or algorithm can be applied (448) to trigger specific logs corresponding to the tag. The computing system can generate the log code corresponding to the identified tag.

As an example, in some embodiments, a performance tag (e.g., #performance, etc.) may trigger algorithm 450 that includes the following actions. A computing system (e.g., server computer 200 of FIG. 1 or the like) can obtain a start point of the tagged block of code and generate a print statement to log the date and time. The computing system can obtain system configuration data such as, for example, memory, diskspace, CPU information, and/or the like. For example, language-specific code to print system configuration data can be generated using the decoding tag document tree node before executing a loop of block. The computing system can check for any loops and/or conditions from the decoding tag document tree and add a print statement to log the date and time. Based on the decoding tag document tree node, a check can be performed to identify external API calls, database operations, and/or any time-consuming operations in the line of code. If such operations are found, print statements can be added before and after the code to log system configurations at that date/time. The computing system can check for end of loop and generate a print statement with system configurations and date/time. The computing system can proceed through every loop and/or condition and repeat the previous actions, including checking for loops/conditions, checking for extremal API calls, database operations, or time-consuming operations, checking for the end of the loop, and generating appropriate print statement for logging. The computing system can check for the end of the block of code. In response to reaching the end of the block of code, the processing time can be calculated based on a current time and a start time and a print statement can be generated for the information. Logger code 454 (see FIG. 4G), including print statements for the current system configurations and date/time, can be generated (452) for logging. In some embodiments, the system configurations data, other log statements, and/or the like can be analyzed and insight data can be added.

Figure 5A:
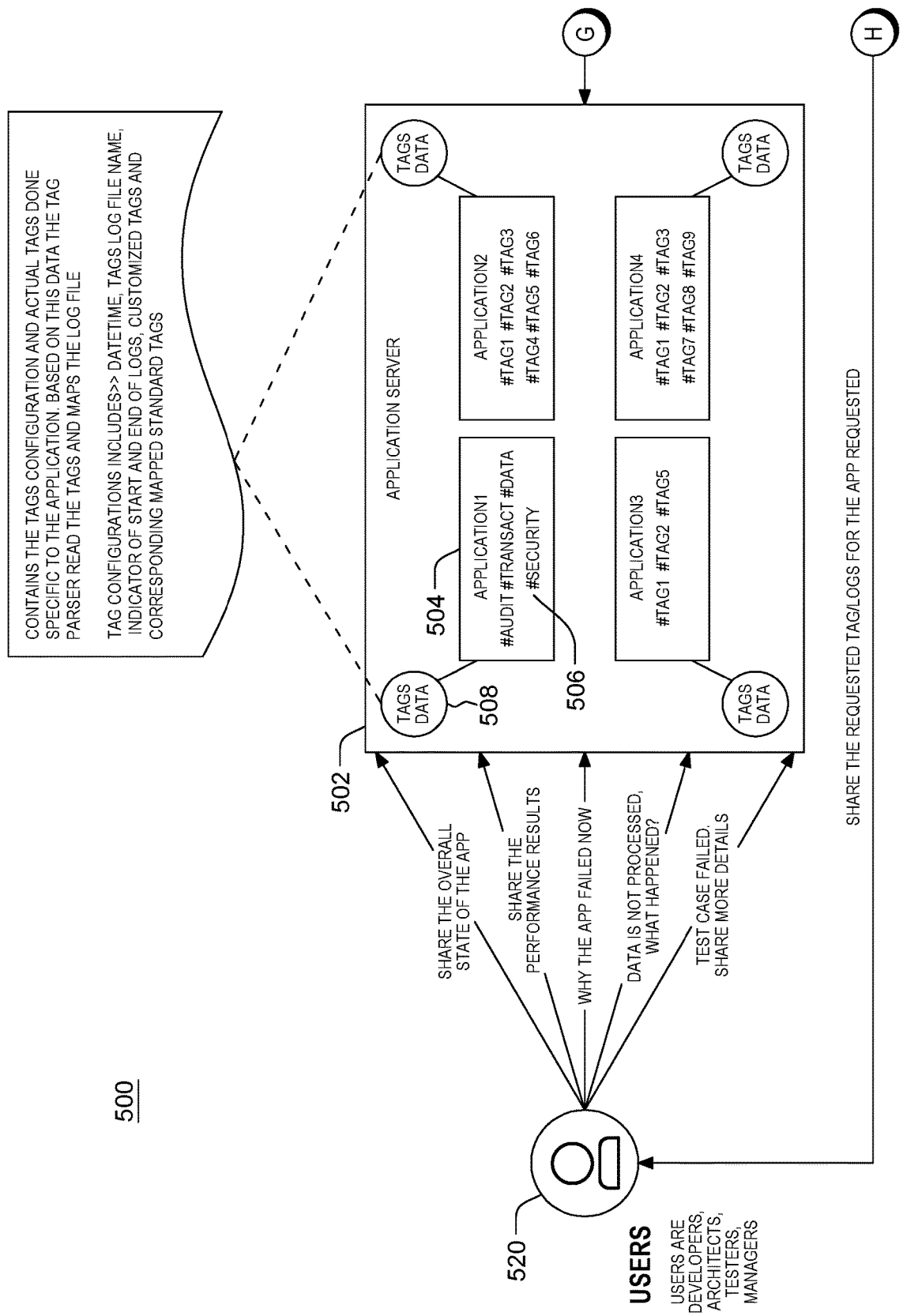
FIGS. 5A and 5B depict a block diagram of an example of logging executable content for applications, according to embodiments of the present invention.
Figure 5B:
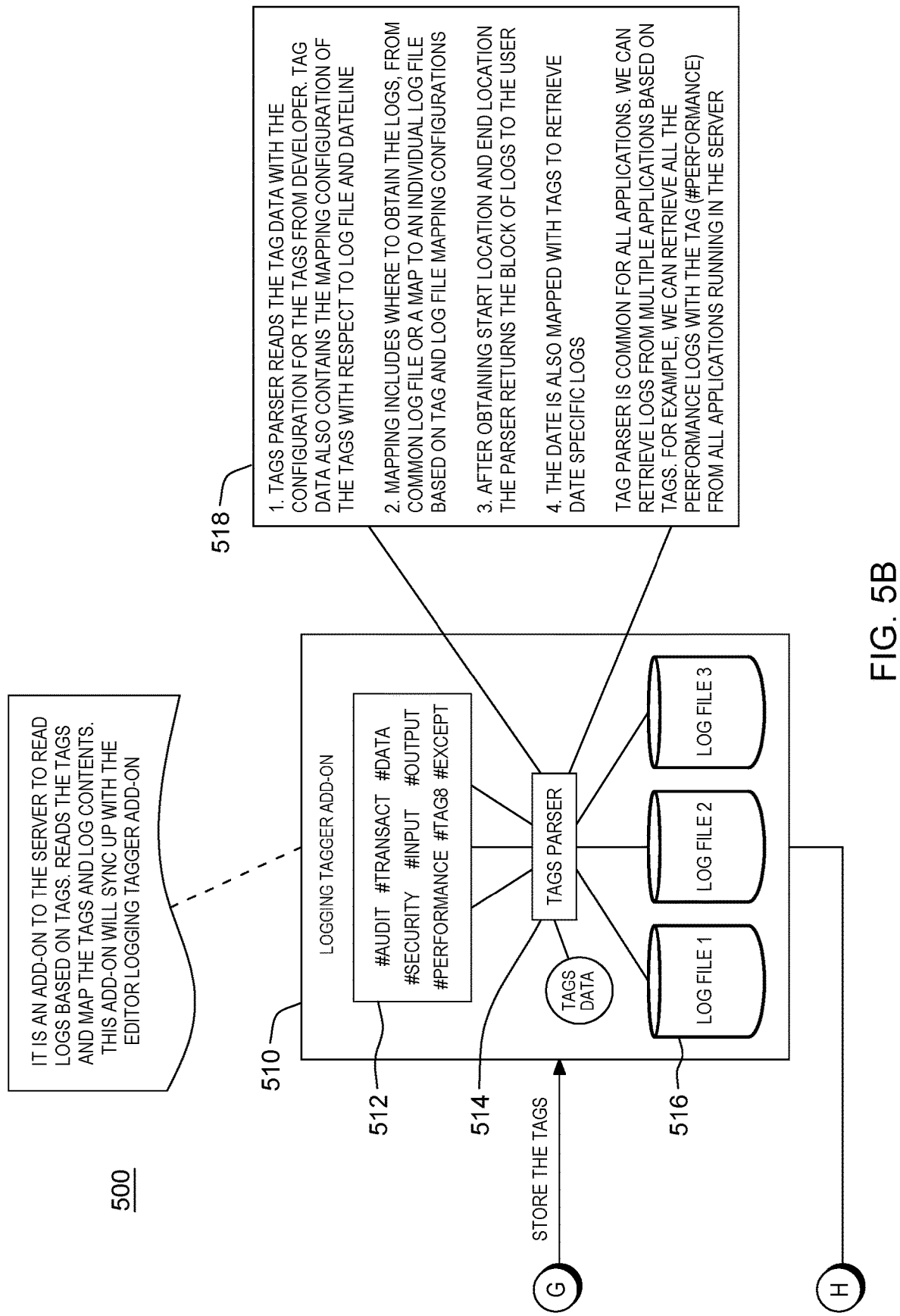

FIGS. 5A and 5B depict a block diagram of an example of an intelligent logging architecture 500 for applications, according to embodiments of the present invention. As illustrated in FIG. 5A, an architecture 500 can include an application server 502. One or more application 504 can be included in and/or associated with the application server 502. Each application 504 may have one or more tags 506 included in the application (e.g., executable code, etc.) Each application 504 be linked/associated to tags data 508. The tags data 508 can include tag configurations including the specific tags assigned to the application. The tags data 508 can be provided, for example to a tags parser, to read the tags and map the log file(s) for an application.

As illustrated in FIG. 5B, a logging tagger 510 can be associated with and/or provided at the application server 502. The logging tagger 510 can provide for reading application tags and log content for the application(s). The logging tagger 510 can include/store information on configured tags 512 that may be used in application logging/documentation. In some embodiments, the logging tagger 510 can sync with a code editor log tagger (e.g., logging tagger code parser 422), for example, to sync associated tag data, log data, and/or the like. The logging tagger 510 can include a tags parser 514.

As shown in tags parser details 518, the tags parser 514, and/or the like can provide for generating log data for application(s) and storing (e.g., printing, etc.) log data for application(s) in one or more log files 516 based, at least in part, on tags data (e.g., tags configurations, log file mappings, etc.). The tags parser 514 can read the tags data including tag configuration and log file mapping. In some embodiments, the tags data can include date/time data, tags log file name, indicators of start and end of logs, customized tags and corresponding mapped standard tags, and/or the like. The tags parser 514 can use log file mapping to determine where to obtain logs. For example, in some embodiments, tags may be mapped to a common log file, mapped to individual log file(s) (e.g., based on tag configurations and log file mapping configurations, etc.), and/or the like.

Continuing with tags parser details 518, the tags parser 514 can provide for retrieving log data, for example, to provide the log data for display, analysis, and/or the like. In some embodiments, the tags parser 514 can provide for grouping logs, for example, based on associated tags. For example, in some embodiments, the tag parser 514 can obtain a start location and end location associated with log data (e.g., requested log data, etc.), obtain a block of the log data, and provide the block of log data to an end user, for example. In some embodiments, date/time information may also be mapped with tags and allow the tags parser 514 to retrieve data specific log data. In some embodiments, a tag parser 514 may be common to multiple applications (e.g., some or all applications on an application server, etc.). The tag parser 514 can provide for retrieving log data from multiple applications based on associated tags data. As an example, the tag parser 514 may retrieve all performance log data with the tag "#performance" for multiple (e.g., some, all, etc.) applications running on application server(s).

Referring back to FIG. 5A, the architecture 500 may also include one or more user interfaces 520 that can provide end users with access to log data. As an example, end users may include application developers, architects, testers, analysts, managers, and/or the like who may access and view logs associated with applications(s), application server(s), and/or the like. For example, a user interface 520 may allow an end user to provide requests for particular log data such as overall state of an application, performance results, failure information, processing errors/issues, testing data, and/or the like. In one example, when an application issue arises (e.g., slowness of application, performance issues, errors, etc.), end user(s) may identify tag(s) associated with and/or related to the particular issue and obtain corresponding log data (e.g., based on the tag(s), etc.). The log data may be analyzed to assist in determining a root cause, resolution, and/or the like.

Figure 6:
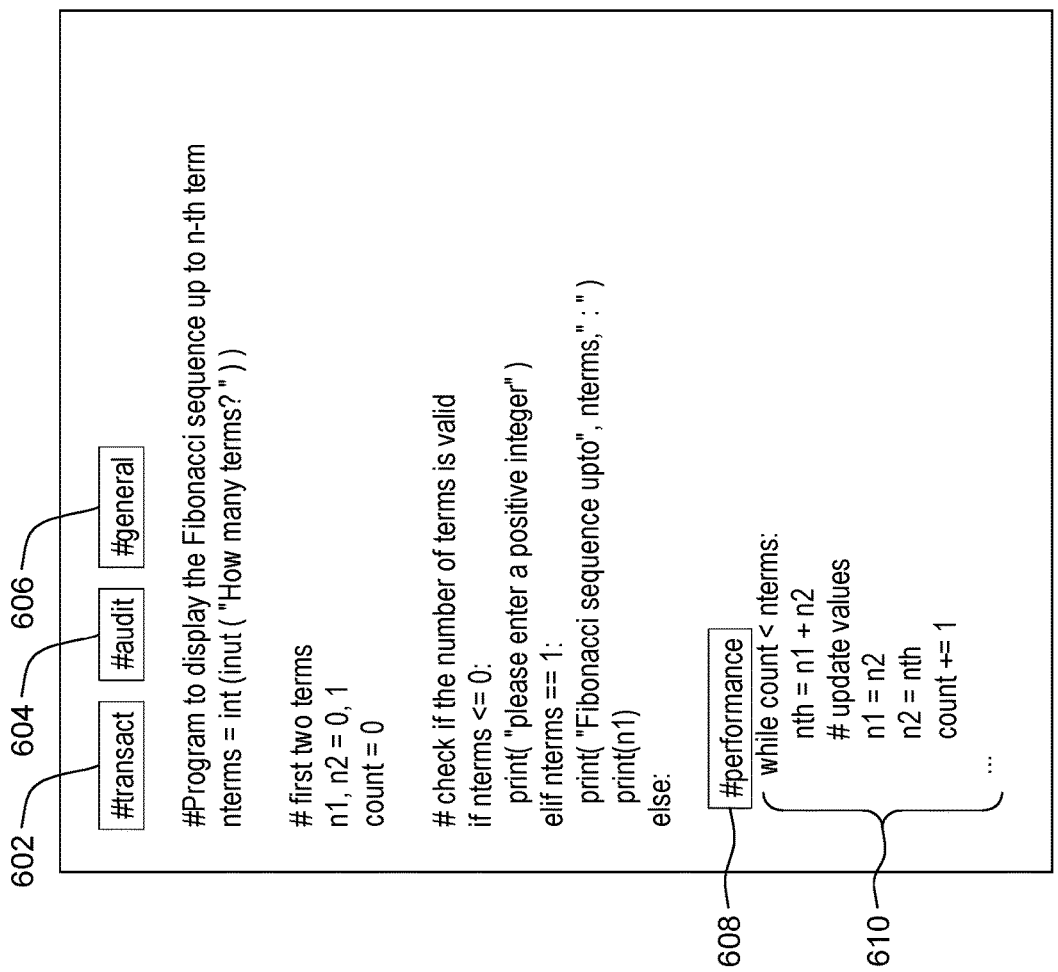
FIG. 6 depicts a block diagram of an example code file containing logging tags, according to embodiments of the present invention.

FIG. 6 depicts a block diagram of an example code file 600 containing logging tags, according to embodiments of the present invention. In some embodiments, for example, systems and/or methods may provide for automatic context-based logging for a block of source code encapsulated by a particular type of tag. As illustrated in FIG. 6, in some embodiments, one or more tags 602, 604, 606, and 608 may be configured for use with source code to allow for intelligent/automated logging, code documentation, and the like.

As an example, a #performance tag 608 may be selected and assigned to a block of code 610 (e.g., inserting a #performance start tag at the start of the block and a #performance end tag (not shown) after the end of the block, etc.). The #performance tag 608 may allow for including a sequence of actions to be triggered for the selected block of code 610. For example, #performance tag 608 may trigger including a series of actions to log (e.g., print, etc.) performance data (e.g., for an application compiled/built from the source code, etc.) to a corresponding performance-related log.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    reading lines of code included in a collection of source code;
    identifying an assigned tag in the collection of source code, the assigned tag being of one predefined tag type of a plurality of different predefined tag types;
    identifying a start tag location and an end tag location associated with the assigned tag, wherein the lines of code included between the start tag location and the end tag location identify a code block;
    generating a decoding tag document tree for the code block based, at least in part, on processing the code block identified with the start tag location and the end tag location, the decoding tag document tree including the assigned tag of the one predefined tag type and specific content associated with the assigned tag from the code block;
    generating logging data for the code block based, at least in part, on the generated decoding tag document tree; and
    providing the logging data for linking to executable byte code compiled from the collection of source code, wherein the logging data is used to log code data relating to the code block during execution of the executable byte code.

2. The computer-implemented method of claim 1, wherein the assigned tag includes an identification of a log file name for logging code data associated with the assigned tag.

3. The computer-implemented method of claim 1, wherein the assigned tag includes an identification of: (i) a start tag utilized in identifying the start tag location, and (ii) an end tag utilized in identifying the end tag location.

4. The computer-implemented method of claim 1, further comprising:
    generating print statements for the code block based, at least in part, on the logging data, wherein the print statements include documentation data for the code block, and wherein the print statements are executed during the execution of the executable byte code.

5. The computer-implemented method of claim 4, wherein the print statements print the documentation data for the code block to a log file.

6. The computer-implemented method of claim 4, wherein the print statements print the documentation data to a display.

7. The computer-implemented method of claim 1, further comprising:
    linking the logging data to the executable byte code; and
    executing the executable byte code, causing the logging of the code data relating to the code block.

8. A computer program product comprising a computer readable storage medium having stored thereon:
    program instructions to read lines of code included in a collection of source code;
    program instructions to identify an assigned tag in the collection of source code, the assigned tag being of one predefined tag type of a plurality of different predefined tag types;
    program instructions to identify a start tag location and an end tag location associated with the assigned tag, wherein the lines of code included between the start tag location and the end tag location identify a code block;
    program instructions to generate a decoding tag document tree for the code block based, at least in part, on processing the code block identified with the start tag location and the end tag location, the decoding tag document tree including the assigned tag of the one predefined tag type and specific content associated with the assigned tag from the code block;

program instructions to generate logging data for the code block based, at least in part, on the generated decoding tag document tree; and program instructions to provide the logging data for linking to executable byte code compiled from the collection of source code, wherein the logging data is used to log code data relating to the code block during execution of the executable byte code.

9. The computer program product of claim 8, wherein the assigned tag includes an identification of a log file name for logging code data associated with the assigned tag.

10. The computer program product of claim 8, wherein the assigned tag includes an identification of: (i) a start tag utilized in identifying the start tag location, and (ii) an end tag utilized in identifying the end tag location.

11. The computer program product of claim 8, the computer readable storage medium having further stored thereon:

program instructions to generate print statements for the code block based, at least in part, on the logging data, wherein the print statements include documentation data for the code block, and wherein the print statements are executed during the execution of the executable byte code.

12. The computer program product of claim 8, the computer readable storage medium having further stored thereon:

program instructions to link the logging data to the executable byte code; and program instructions to execute the executable byte code, causing the logging of the code data relating to the code block.

13. A computer system comprising:

a processor set; and a computer readable storage medium; wherein:

the processor set is structured, located, connected and programmed to run program instructions stored on the computer readable storage medium; and the stored program instructions include:

program instructions to read lines of code included in a collection of source code;

program instructions to identify an assigned tag in the collection of source code, the assigned tag being of one predefined tag type of a plurality of different predefined tag types;

program instructions to identify a start tag location and an end tag location associated with the assigned tag, wherein the lines of code included between the start tag location and the end tag location identify a code block;

program instructions to generate a decoding tag document tree for the code block based, at least in part, on processing the code block identified with the start tag location and the end tag location, the decoding tag document tree including the assigned tag of the one predefined tag type and specific content associated with the assigned tag from the code block;

program instructions to generate logging data for the code block based, at least in part, on the generated decoding tag document tree; and program instructions to provide the logging data for linking to executable byte code compiled from the collection of source code, wherein the logging data is used to log code data relating to the code block during execution of the executable byte code.

14. The computer system of claim 13, wherein the assigned tag includes an identification of a log file name for logging code data associated with the assigned tag.

15. The computer system of claim 13, wherein the assigned tag includes an identification of: (i) a start tag utilized in identifying the start tag location, and (ii) an end tag utilized in identifying the end tag location.

16. The computer system of claim 13, the stored program instructions further including:

program instructions to generate print statements for the code block based, at least in part, on the logging data, wherein the print statements include documentation data for the code block, and wherein the print statements are executed during the execution of the executable byte code.

17. The computer system of claim 13, the stored program instructions further including:

program instructions to link the logging data to the executable byte code; and program instructions to execute the executable byte code, causing the logging of the code data relating to the code block.

* * * * *